United States Patent
Weiss et al.

(10) Patent No.: US 7,866,633 B2
(45) Date of Patent: Jan. 11, 2011

(54) EXTERNAL MOUNTED BRAKE FOR A DRIVING DISK

(75) Inventors: Harald Weiss, Stottwang (DE); Herbert Vogt, Mauerstetten (DE); Christoph Dropmann, Kaufbeuren (DE); Josef Eisenburger, Turkheim (DE)

(73) Assignee: Chr. Mayr GmbH & Co. KG, Mauerstetten (DE)

( * ) Notice: Subject to any disclaimer, the term of this patent is extended or adjusted under 35 U.S.C. 154(b) by 90 days.

(21) Appl. No.: 11/920,484

(22) PCT Filed: May 17, 2006

(86) PCT No.: PCT/EP2006/004695
§ 371 (c)(1),
(2), (4) Date: Jan. 28, 2009

(87) PCT Pub. No.: WO2006/122796
PCT Pub. Date: Nov. 23, 2006

(65) Prior Publication Data
US 2009/0236186 A1 Sep. 24, 2009

(30) Foreign Application Priority Data
May 18, 2005 (DE) .................. 10 2005 022 897

(51) Int. Cl.
*B66D 5/08* (2006.01)
(52) U.S. Cl. .................. 254/378; 254/275; 254/319
(58) Field of Classification Search .............. 254/274, 254/275, 276, 319, 378
See application file for complete search history.

(56) References Cited

U.S. PATENT DOCUMENTS

| 4,275,803 A | * | 6/1981 | Putney | 188/134 |
| 4,433,755 A | * | 2/1984 | Ohtomi | 187/254 |
| 4,569,423 A | * | 2/1986 | Hirano | 254/343 |
| 5,018,603 A | * | 5/1991 | Ito | 187/254 |
| 5,201,821 A | * | 4/1993 | Ericson et al. | 254/375 |
| 5,921,866 A |   | 7/1999 | Weiss | |
| 5,944,150 A | * | 8/1999 | Hikari | 188/161 |
| 6,766,883 B2 | * | 7/2004 | Miyoshi | 187/254 |
| 6,851,520 B2 | * | 2/2005 | Nagata et al. | 187/286 |
| 2003/0164265 A1 | * | 9/2003 | Miyoshi | 187/254 |

FOREIGN PATENT DOCUMENTS

DE 296 04 779 U1 7/1996
EP 0 545 369 A2 6/1993

\* cited by examiner

*Primary Examiner*—Emmanuel M Marcelo
(74) *Attorney, Agent, or Firm*—W. Norman Roth

(57) ABSTRACT

The invention relates to an electromagnetically ventilating spring-pressure brake for mounting on the driving disk (15) or the driving disk shaft (16) of already existing elevators, which are operated with cables passing over a driving disk. The external-mounted brake (1) is situated concentric to the central axis of the driving disk (15) or driving disk shaft (16) on a separate base (23) of the structure on the free side (i.e. opposite the driving side) of the driving disk (15) and is fastened in a stationary and rotationally fixed manner. The rotor (5) of the brake (1) is connected in an essentially rotationally fixed manner to the free end of the driving disk (15) or of the driving disk shaft (16) in order to transmit the braking torque of the external-mounted brake to the driving disk (15).

8 Claims, 13 Drawing Sheets

EXTERNAL MOUNTED BRAKE FOR A DRIVING DISK

In elevators having a passenger cabin suspended from cables passed over a driving disk or sheave and counterbalanced by counterweights, problems may arise where the elevator is not sufficiently secured in an upward direction in the event of component failure. If the elevator attains some downward speed limit, a gripping or clamping device will engage. In the past, no such gripping device was provided for run-away upward movement (as may happen due to the counterweights.

For this reason, an additional brake was needed for retrofitting elevators to stop their upward movement and to so offer increased safety from accidents. Possible sources of malfunction include catastrophic failure of gearbox output shafts or of gears within the gearbox, and failure of the main system brake—although the brake is designed usually to operate as a dual-circuit system.

One object of the invention is an enhanced safety in upward and downward elevator travel by means of an additional brake placed in an optimum position.

This object is achieved by an additional brake which is directly attached to the driving sheave over which the passenger cabin and counterweight cables are passed and which directly acts on that driving sheave. This ensures additional safety at each stop where the brake is being engaged. Also, in an emergency, movement is stopped in both an upward and a downward direction whenever the brake receives a signal indicative of excessive speed.

As another object, it is desirable for the brake to be attached to existing elevator systems. Thus, the task was to find a design solution which enables a safety brake to be adapted to a variety of structural and design particularities where a driving sheave may be constrained to operate. There are sheave-driving gear-box output shafts which have a trunnion separately journalled at their far end, i.e. on the side opposite the drive (see shaft 16 in FIG. 4). Also known are conical output shafts with a pressure cap (shaft 16 in FIG. 5), and driving sheaves provided on the hub side (hub 27 in FIG. 6) with extra material where additional threaded bores (28 in FIG. 6) can be placed for torque transmission. If too little material is available on the hub side of the driving sheave, the sheave must be provided with screw thread(s) along the periphery (15 in FIG. 7). Another possibility is the use of the sheave spokes for torque transmission (FIG. 8).

The said objects are achieved by a brake designed to be externally mounted adjacent an existing driving sheave, said brake providing the possibility of additional support for the sheave or transmitting the torque from said brake to the sheave via an additional flange incorporating resilient elements.

These particular variants ensure that existing elevators can be retrofitted (without incurring major efforts) with an additional brake placed next to the existing driving sheave. What is needed for retrofitting is merely a structural element providing for height adjustment between the building-side brake support and the mounting bracket of the brake.

With this solution, the brake directly engages the driving sheave and is coupled to it in a torque-locked manner. Intermediate element between the drive and the driven sheave (which might cause malfunction) are eliminated or not present in the first place.

Various embodiments of the present invention will now be described under reference to the attached drawings.

The brake to be externally mounted operates on the well-known principle of a normally energized spring-pressure brake, which acts as a safety brake as the compression springs therein cause the brake to engage as soon as the electrical current energizing the electromagnets fails.

Figure 1:
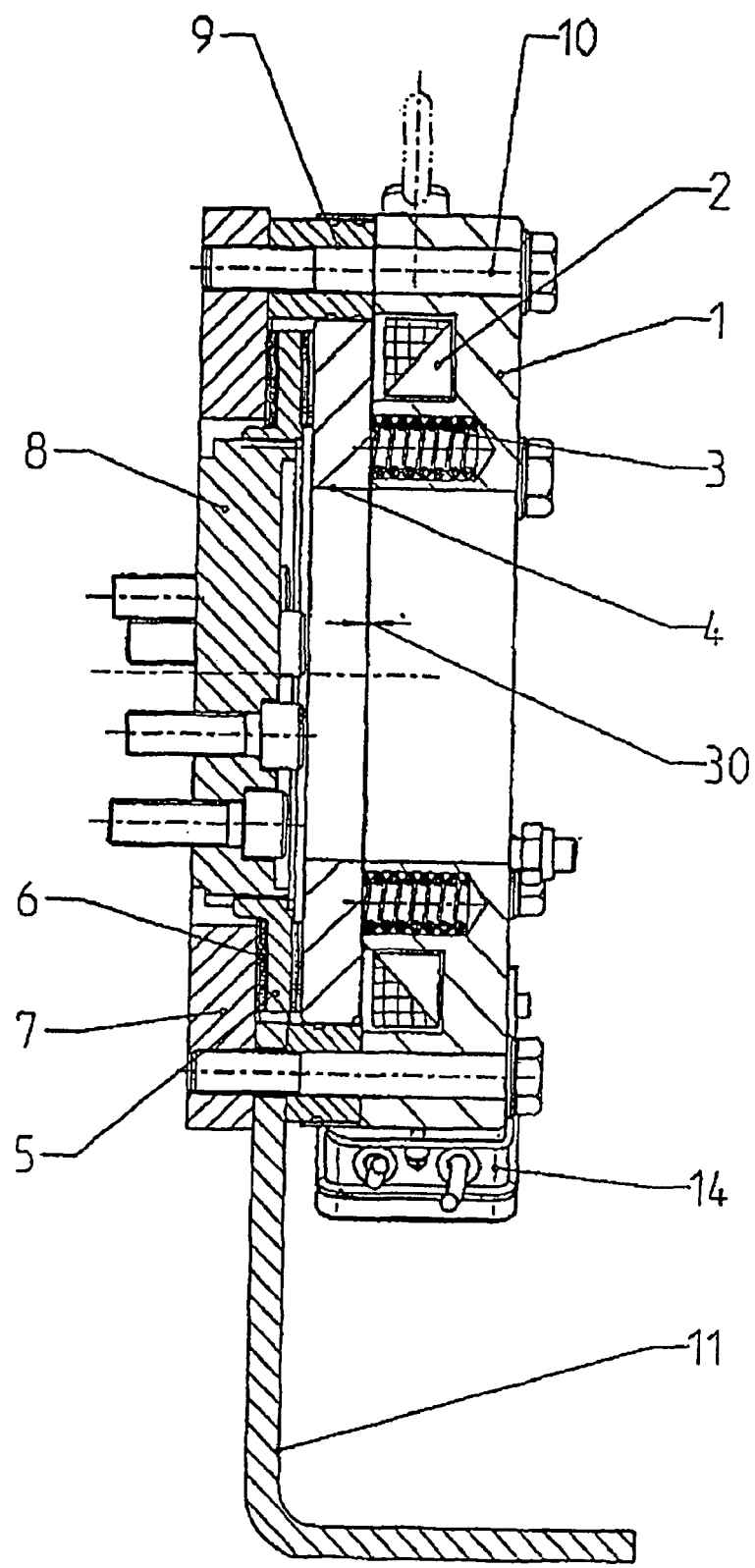
FIG. 1 shows a section of the brake to be mounted externally.

FIG. 1 shows brake 1 comprising an electromagnetic coil 2. Compression springs 3 urge armature disk 4 against rotor 5, which has a friction liner 6 on both the right hand and the left hand sides. The torque (braking torque) is generated by said compression springs urging armature disk 4 against rotor 5 via both friction liners 6 and a flange plate 7. The torque is transmitted from rotor 5 to a peripherally toothed or splined transfer flange 8.

For releasing or disengaging the brake, electrical D.C. power is applied to electromagnetic coil 2, resulting in a magnetic field which (via air gap 30 and against the bias exerted by compression springs 3) attracts armature disk 4 against brake 1, thus releasing rotor 5 and transfer flange 8—through the peripheral teeth thereof—for rotation.

Brake 1 is threadingly connected with flange plate 7 via spacer sleeves 9 through fastener screws 10 which are parallel with the central longitudinal axis. In between, there is provided a mounting bracket 11 having in a perpendicularly bent base portion thereof slots 12 for fastening said bracket to a base plate or supporting base 23 (FIG. 4) of the respective building.

Figure 2:
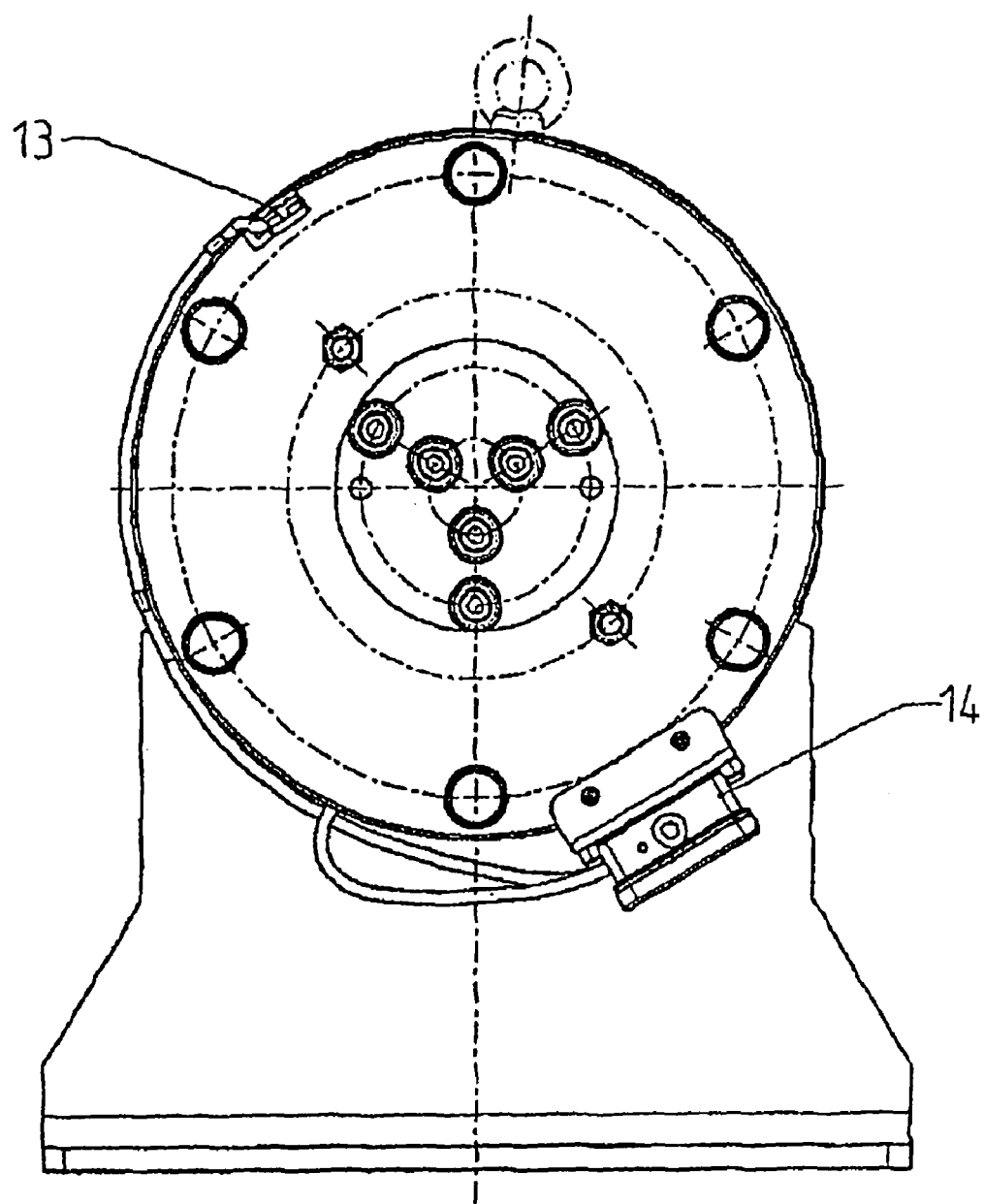
FIG. 2 shows an elevation of the subject brake form the right hand side thereof.

FIG. 2 shows a junction box 14 as well as a monitoring device 13 for monitoring, or signalling to the associated controller, the operating condition of the brake (engaged or disengaged).

Figure 3:
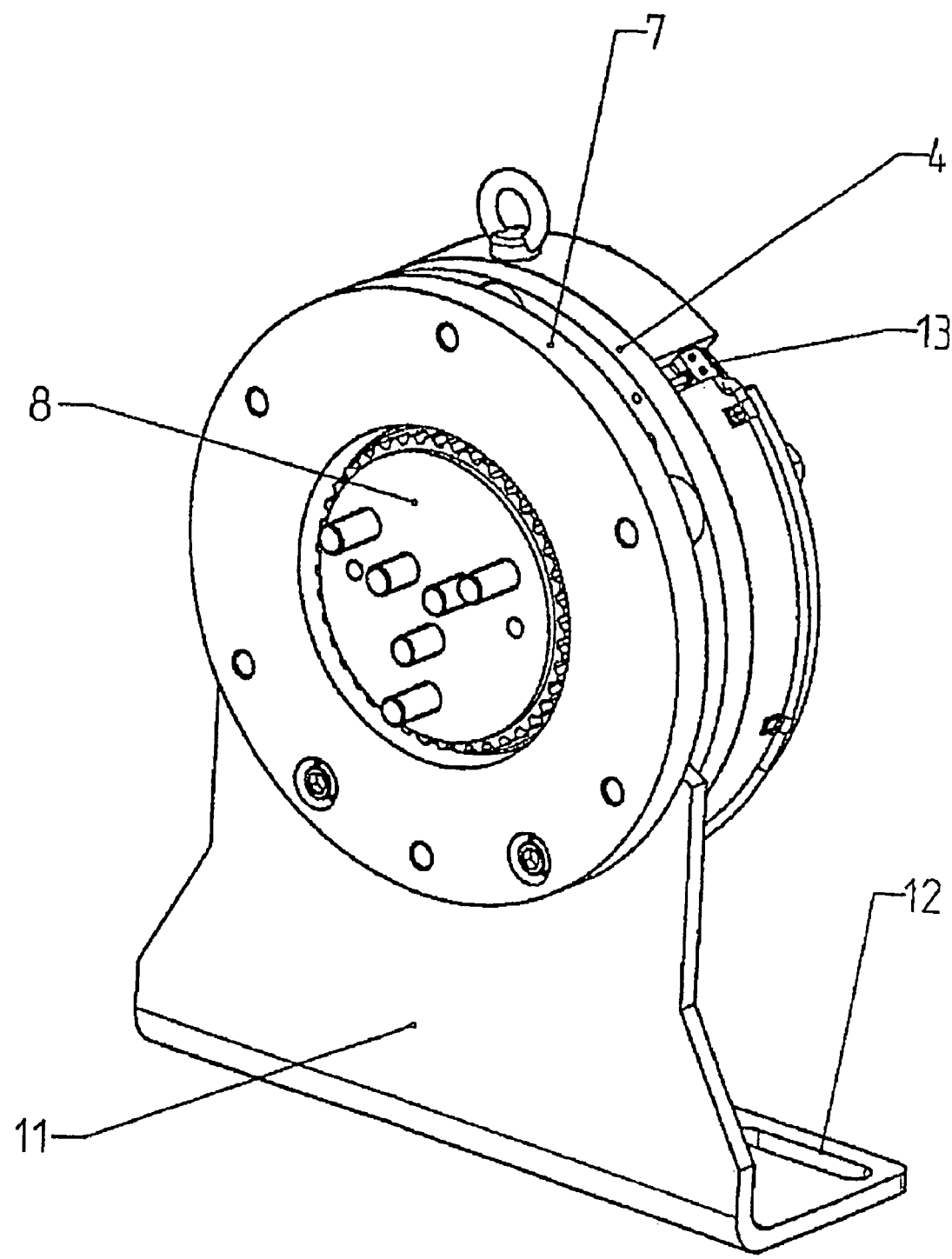
FIG. 3 shows a perspective view of the brake to be mounted externally.

FIG. 3 shows central transfer flange 8 and its peripheral teeth extending axially into rotor 5 (FIG. 1) for torque transfer. Bracket 11 is secured through its slots 12 to supporting base 23 (FIG. 4).

Figure 4:
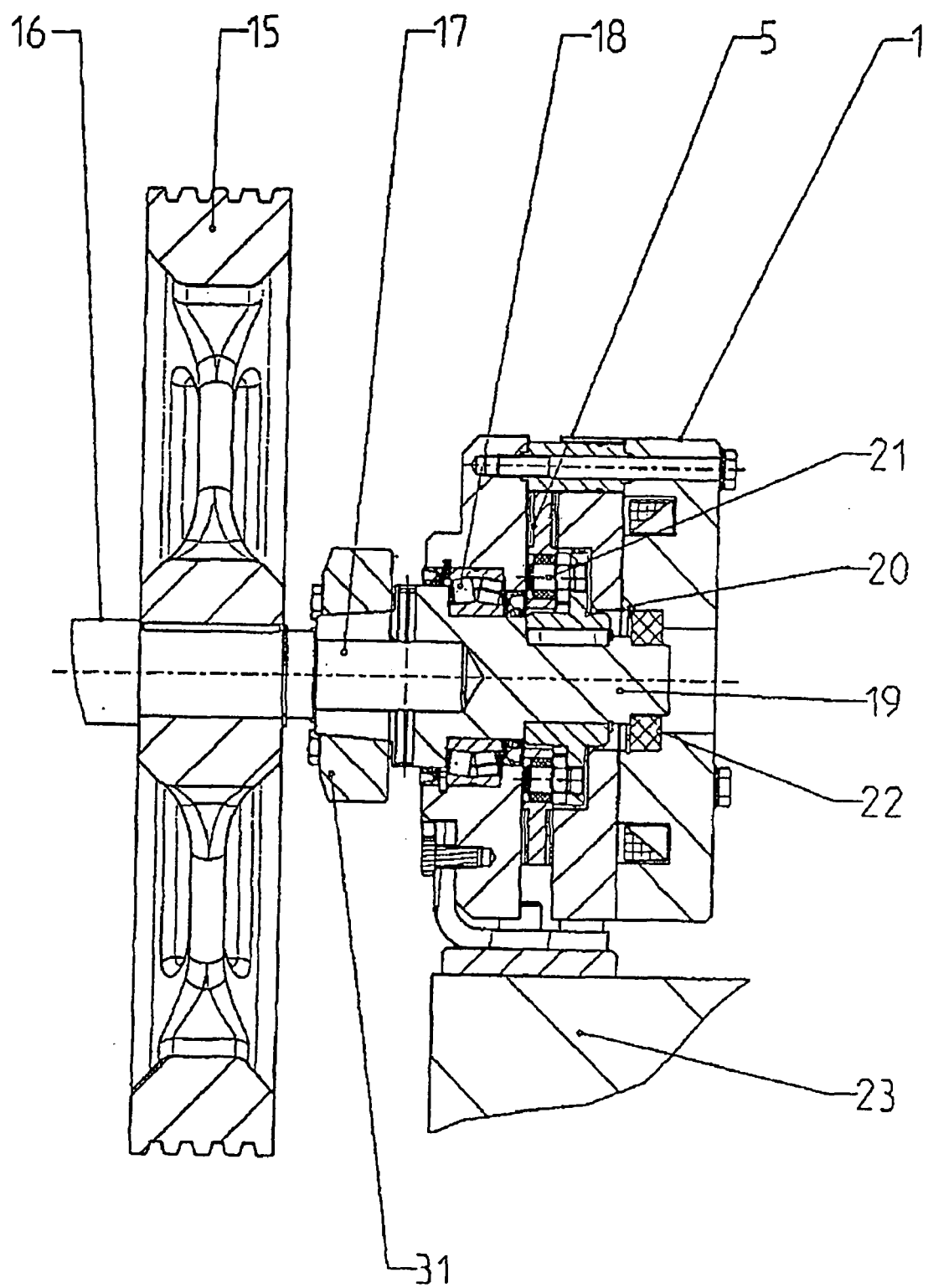
FIG. 4 shows a sectional view of the externally mounted brake and the driven shaft (trunnion 17) as well as the additional support thereof inside the brake.
Figure 4A:
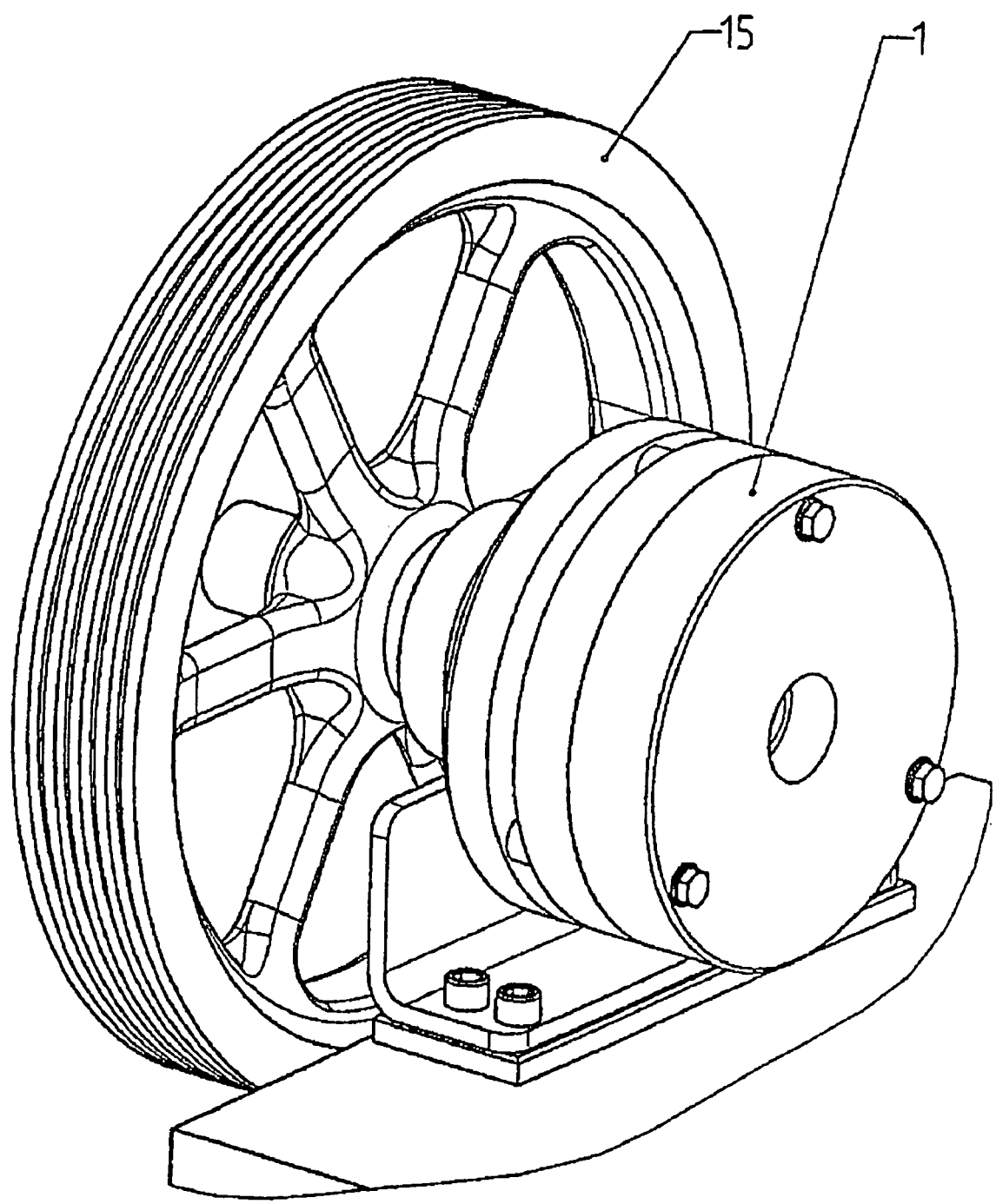
FIG. 4a shows a perspective view of the assembly in FIG. 4.

FIG. 4 shows sheave shaft 16 powered by a conventional drive assembly (not shown) and having driving sheave 15 keyed on it for torque-locked rotation. Conventionally, driving sheave shaft 16 has a trunnion 17 mounting the sheave by means of a conventional pedestal-type bearing. In accordance with the invention, such pedestal-type bearing is eliminated in that the externally mounted brake comprises an additional bearing 18 in the form of a self-aligning bearing which assumes the task of supporting trunnion 17. An attachment hub 19 having a supplementary hub section 20, which is keyed thereto, comprises resilient elements 21 for torque transfer to brake rotor 5. Attachment hub 19 is secured in place by trunnion 17 through a conical clampdown connection 31 so as to transfer the torque to driving sheave shaft 16, to which driving sheave 15 is keyed. Additional support is provided by a plain bearing (bush bearing) 22.

Figure 5:
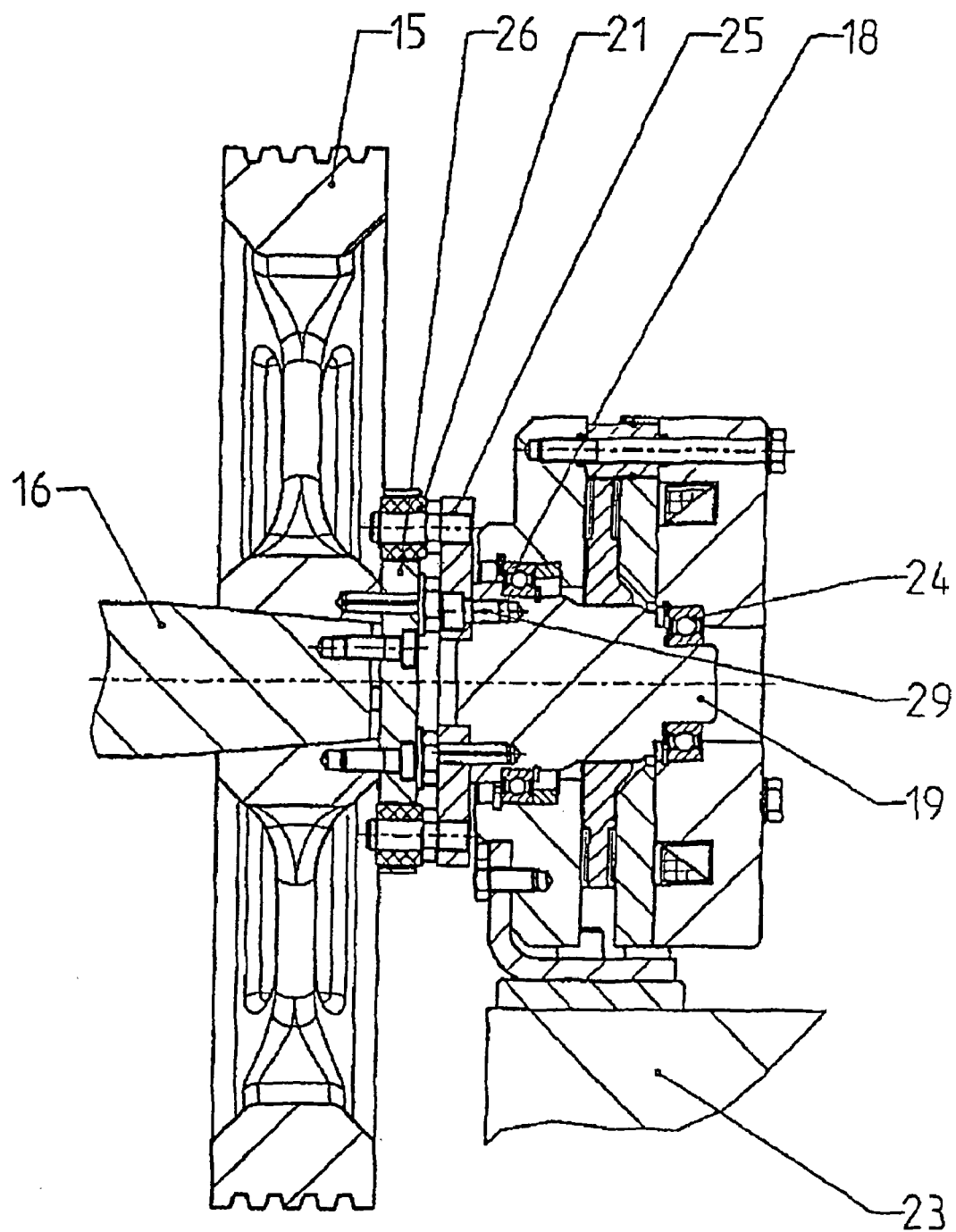
FIG. 5 shows a sectional view of the externally mounted brake in conjunction with a coupling flange 26 replacing a pressure cap for axially fixing the sheave.
Figure 5A:
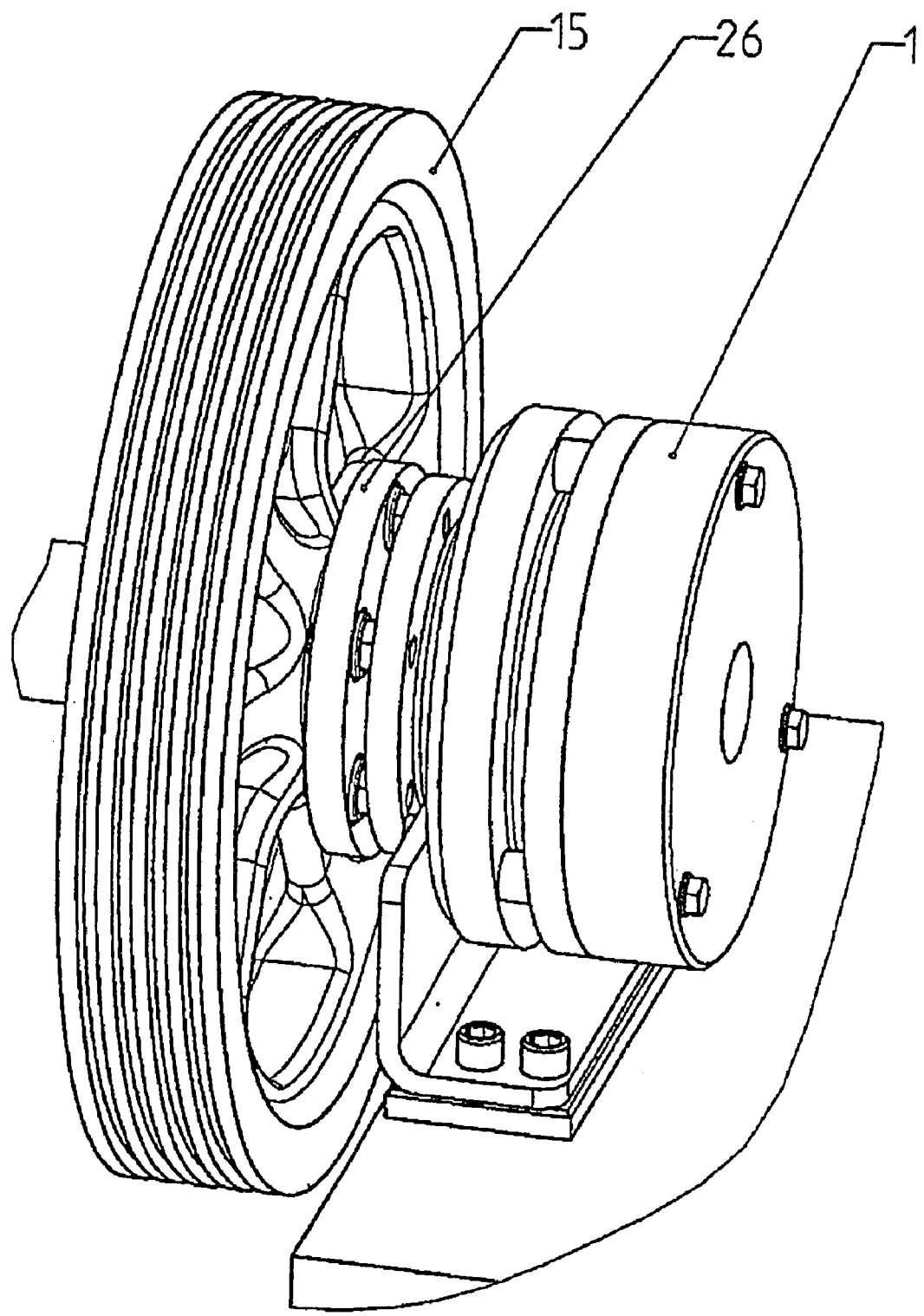
FIG. 5a shows a perspective view of FIG. 5.

FIG. 5 shows attachment hub 19 connected with intermediate flange 25 by fasteners 29. In accordance with the invention, the pressure cap used in the past to secure driving sheave 15 axially to the tapered shaft section is replaced by a novel coupling flange 26 connected through resilient elements 21 for torque transfer. Attachment hub 19 is supported separately inside the brake by bearings 18 and 24.

Figure 6:
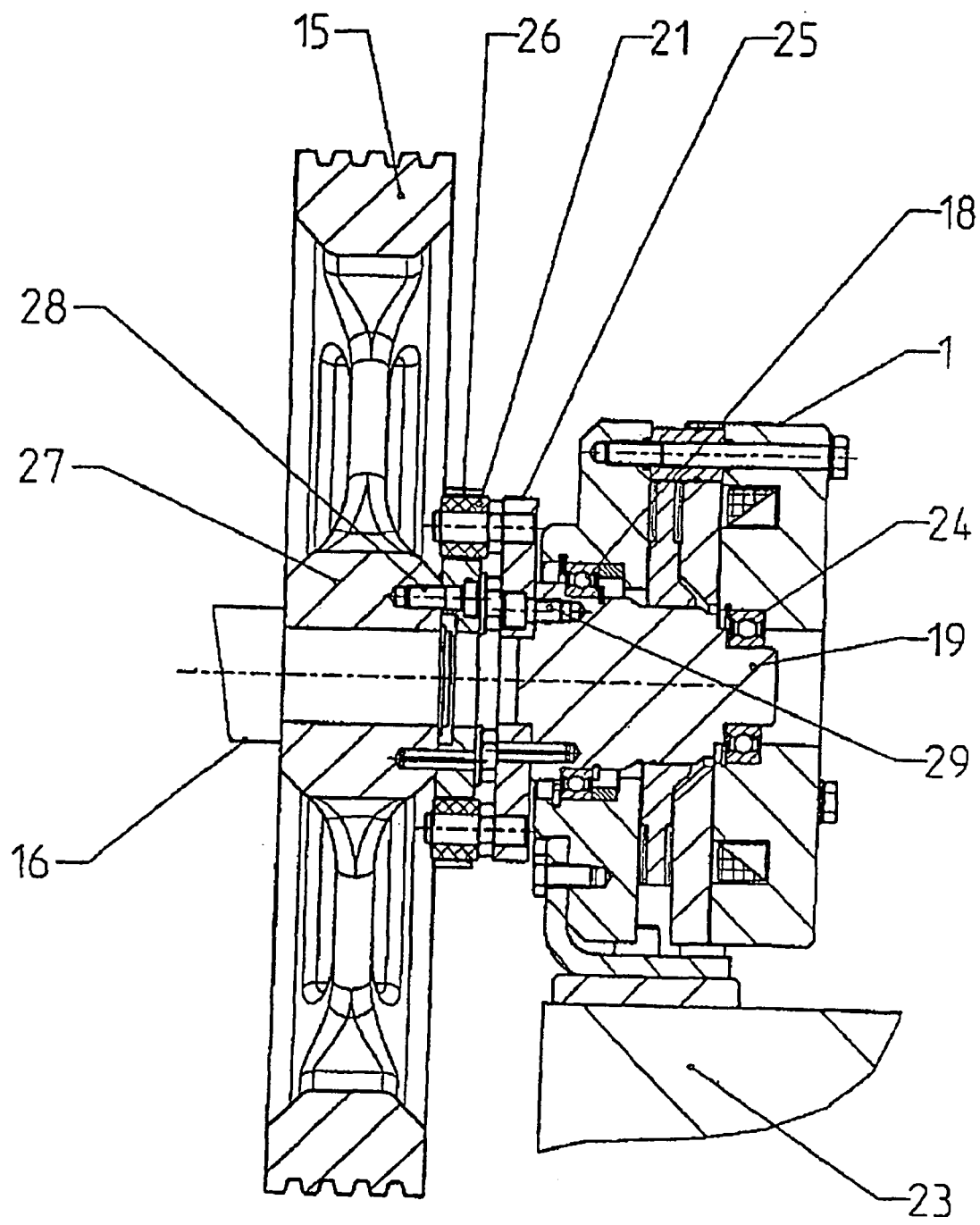
FIG. 6 shows a sectional view of the externally mounted brake secured in place by threads 28 in hub 27 of the sheave.
Figure 6A:
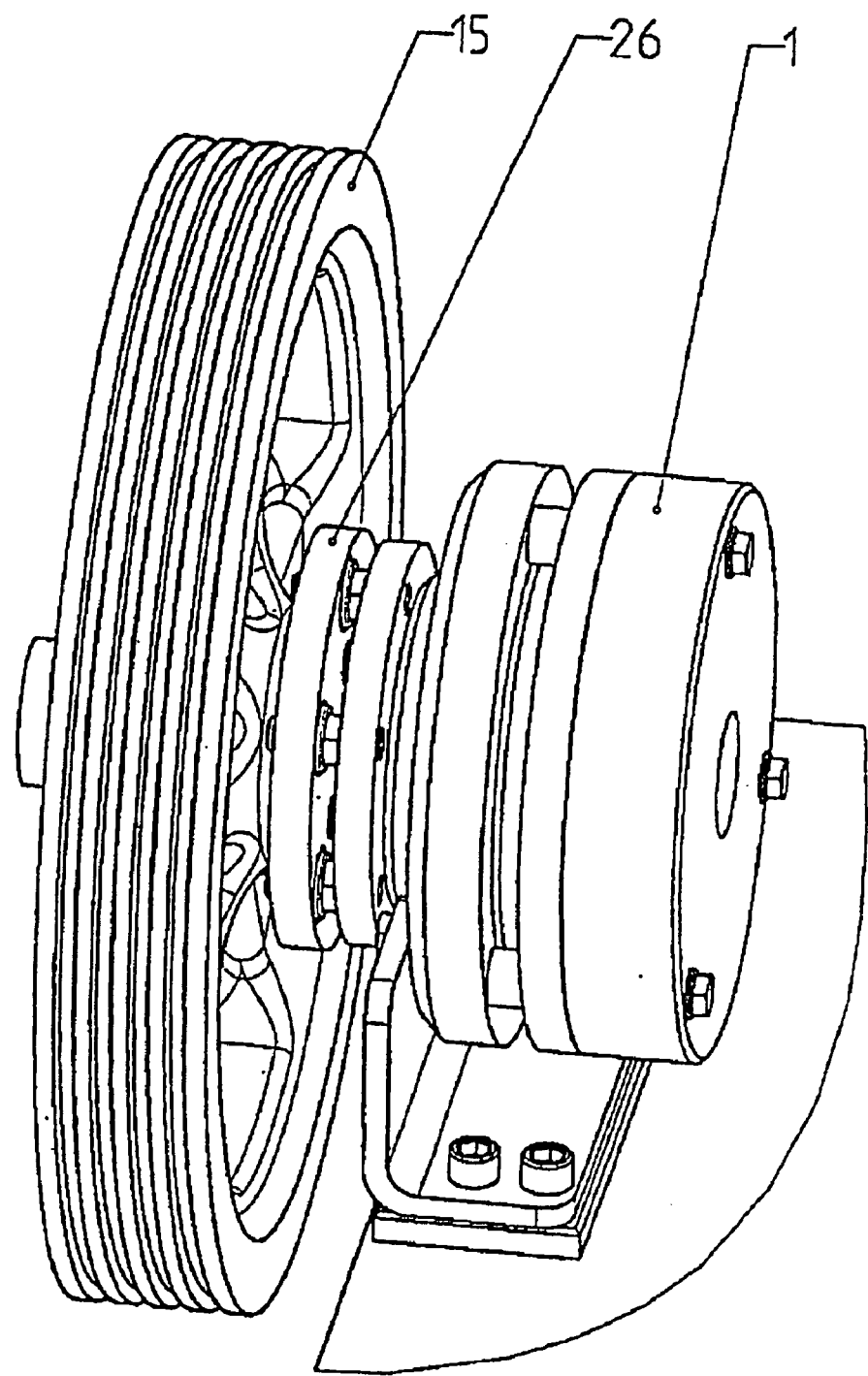
FIG. 6a shows a perspective view of FIG. 6.

FIG. 6 shows a variant similar to FIG. 5, but with coupling flange 26 connected by threaded bolts 28 with the interior hub 27 of driving sheave 15 only.

Figure 7:
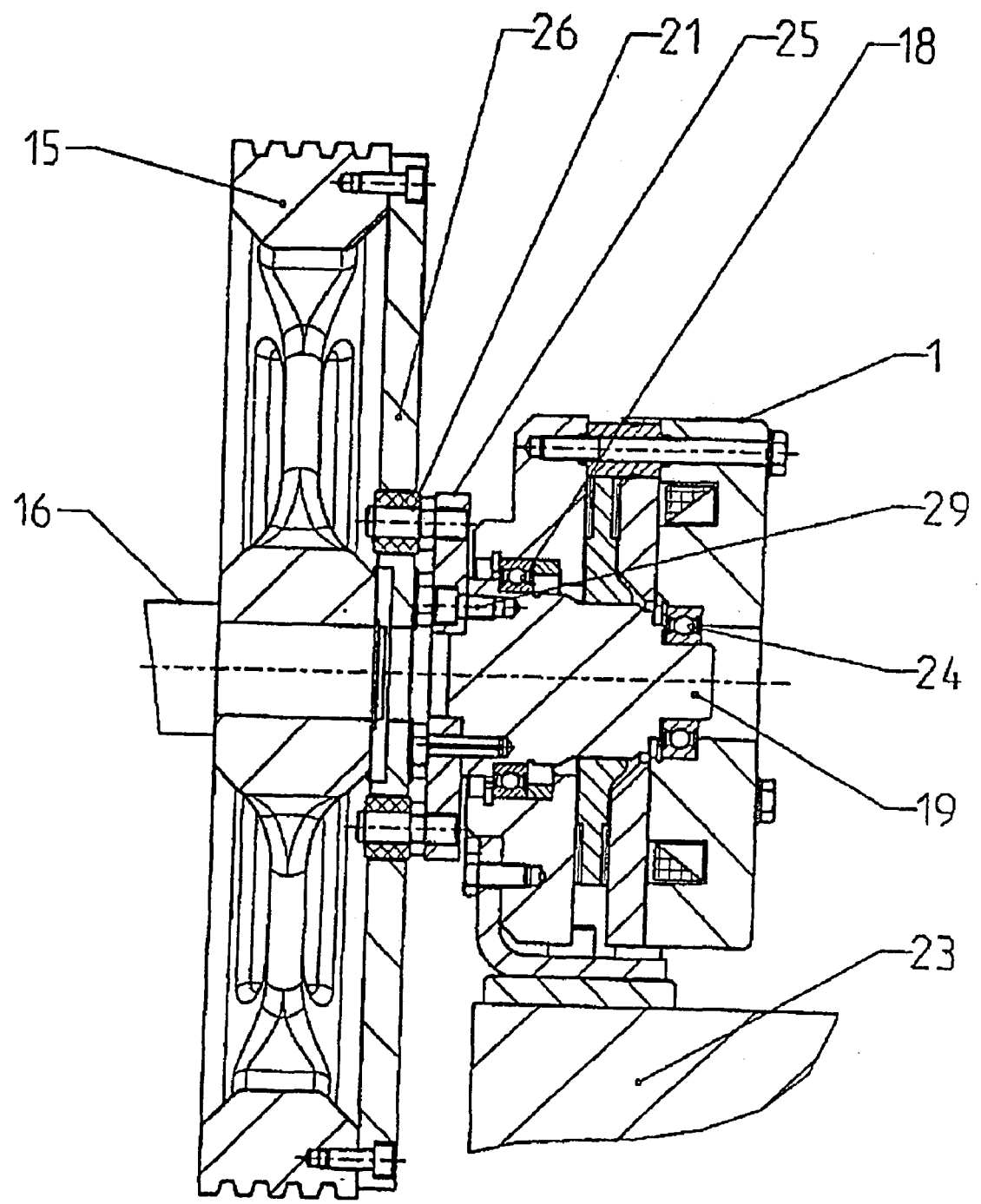
FIG. 7 shows a sectional view of the externally mounted brake including a connecting flange, said brake secured to the outer ring 15 of the sheave.
Figure 7A:
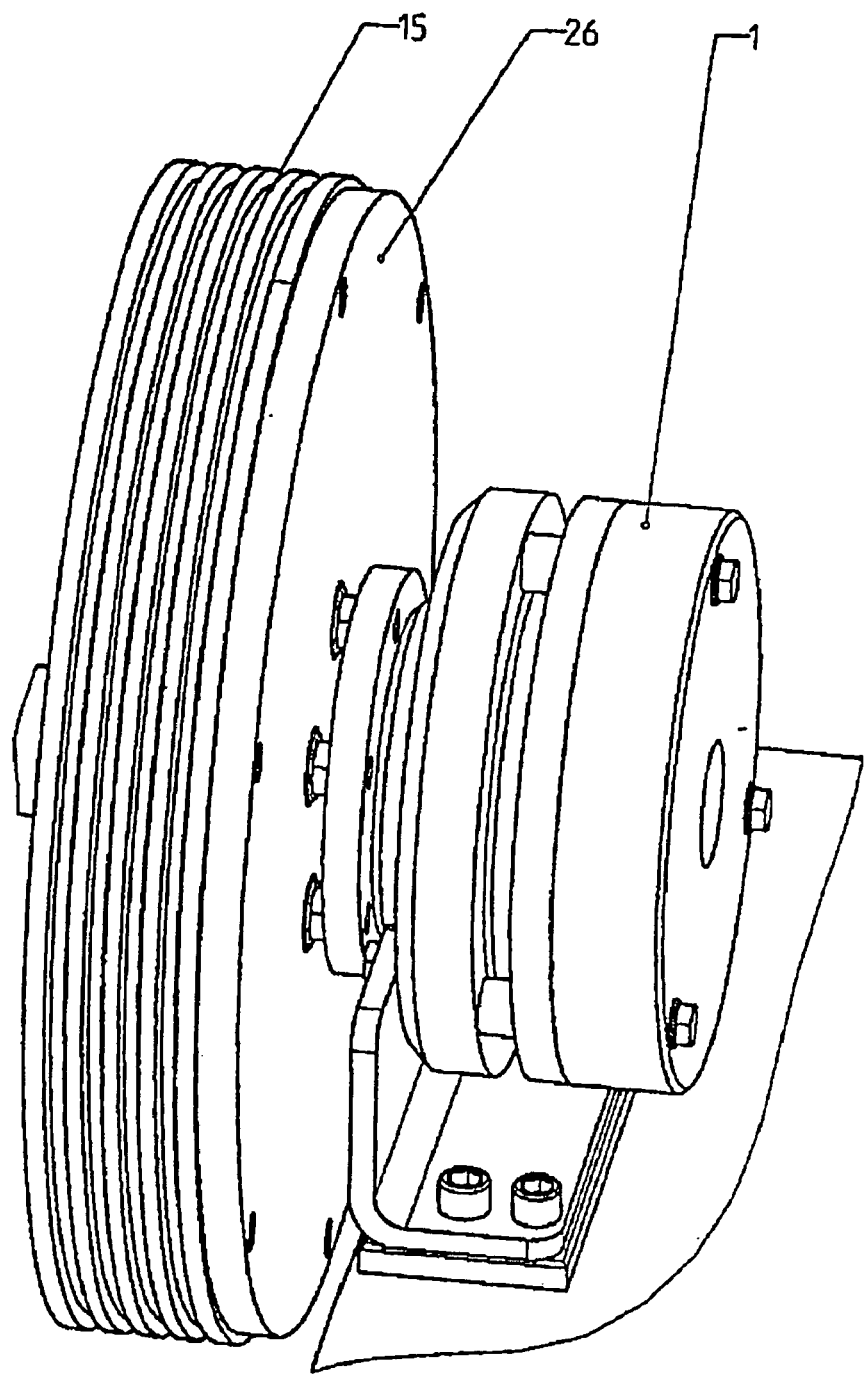
FIG. 7a shows a perspective view of FIG. 7.

FIG. 7 shows a variant in which coupling flange 26 is connected to the outer ring of driving sheave 15.

Figure 8:
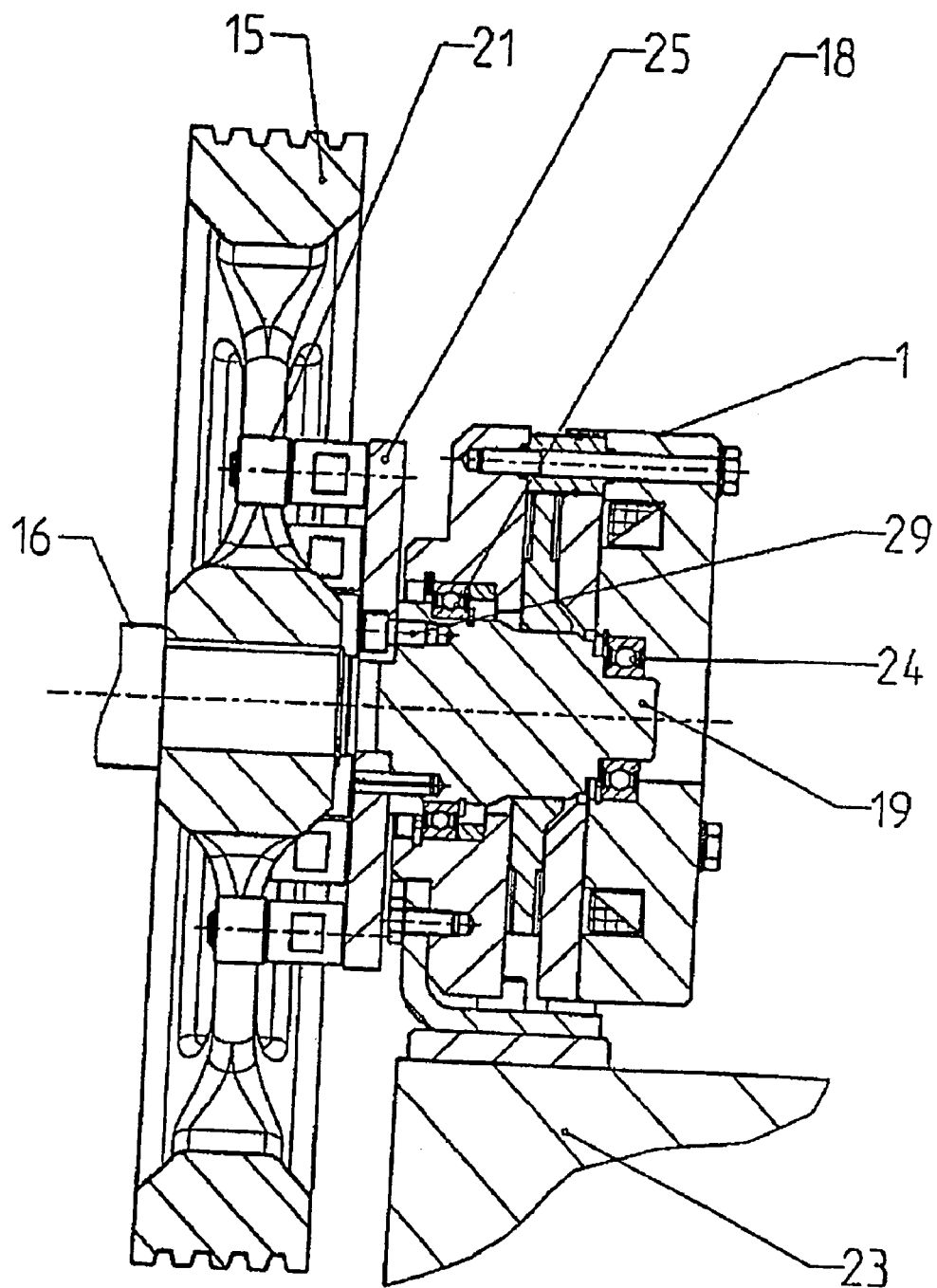
FIG. 8 shows a sectional view of the externally mounted brake together with a connecting flange for entrainment by the spokes of the driving sheave.
Figure 8A:
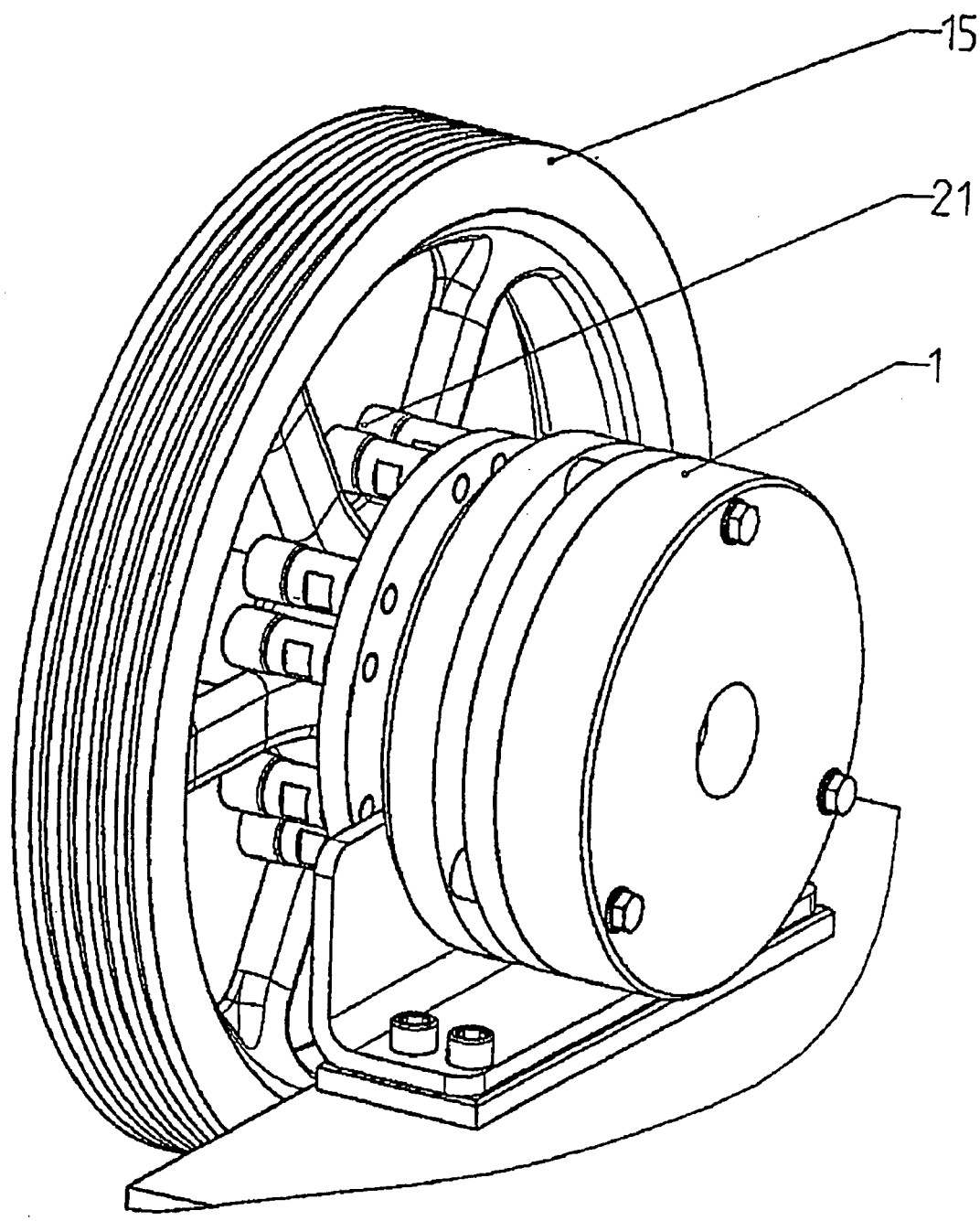
FIG. 8a shows a perspective view of FIG. 8.

FIG. 8 shows a variant in which resilient elements 21 extend from intermediate flange 25 in between the spokes of driving sheave 15, with each spoke engaged on the right- and lefthand sides by two such resilient elements 21 (FIG. 8a) so that torque transfer can be ensured to be optimally free from backlash.

LIST OF REFERENCE CHARACTERS 1 brake
2 electromagnetic coil
3 compression springs
4 armature disk
5 rotor
6 friction liners (right/left)
7 flange plate
8 transfer flange (peripherally toothed)
9 spacer sleeves
10 fastener screws
11 mounting bracket
12 slots
13 brake disengagement monitoring device (engagement/disengagement signalling)
14 junction/connection box
15 driving sheave
16 driving sheave shaft
17 trunnion
18 bearing in flange plate 7
19 attachment hub
20 supplementary hub portion
21 resilient elements
22 plain or bush bearing for supplementary support
23 supporting base
24 ball bearing in brake 1
25 intermediate flange
26 coupling flange (receiving resilient elements 21)
27 driving sheave inner hub
28 threaded bolts (securing part 26 to part 27)
29 threaded bolts (securing part 25 to part 19)
30 air gap between armature disk 4 and brake 1
31 clamp connection on hub 19 for coupling with trunnion 17

The invention claimed is:

1. An electromagnetically disengaged spring-pressure brake for attachment to existing driving sheaves or the drive shafts thereof at the side of the sheaves opposite a sheave or shaft drive means in elevators which are operated using cables passed over a driving sheave, said brake being mountable on the drive shaft concentrically with the central axis of the sheave, said brake including a bracket for securing and supporting said brake on a base at said side of the sheave opposite the sheave drive means, said brake having a rotor which may be coupled fixedly or resiliently with at least one of said sheave and said shaft for transmitting the braking torque of the externally mounted brake to said sheave.

2. Brake as in claim 1, wherein said bracket has slots therein for receiving fasteners for connecting said brake to said base.

3. Brake as in claim 2, further comprising a bearing assembly within the brake for supporting a sheave.

4. Brake as in claim 1, further including a clamp for connecting said brake to a sheave drive shaft.

5. Brake as in claim 1, wherein said brake includes an attachment hub and two bearings supporting said attachment hub.

6. Brake as in claim 5, further comprising an intermediate flange affixed to said attachment hub and resilient elements peripherally distributed to axially extend into the spokes of a driving sheave, said elements adapted to be matched to the spacing between the spokes by means of a plurality of bores in said intermediate flange.

7. Brake as in claim 6, comprising a dual-circuit brake having two serially connected brakes and a split armature disk.

8. Brake as in claim 1, characterized by including an emergency manual disengagement feature in the form of screws for forcing an armature disk in said brake against compression springs to so disengage said brake.

* * * * *